W. D. ARNSBURGER.
TRANSMISSION GEARING.
APPLICATION FILED JULY 8, 1912.

1,079,463.  Patented Nov. 25, 1913.

Witnesses
Clarence M. Smith
J. B. Webster

Inventor
Walter D. Arnsburger
By Percy S. Webster
Attorney

UNITED STATES PATENT OFFICE.

WALTER D. ARNSBURGER, OF PATCH GROVE, WISCONSIN.

TRANSMISSION-GEARING.

1,079,463.  Specification of Letters Patent.  Patented Nov. 25, 1913.

Application filed July 8, 1912. Serial No. 708,155.

*To all whom it may concern:*

Be it known that I, WALTER D. ARNSBURGER, a citizen of the United States, residing at Patch Grove, in the county of Grant, State of Wisconsin, have invented certain new and useful Improvements in Transmission-Gearing; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in transmission gearing for motor vehicles, the object of the invention being to produce a direct clutch mechanism for each change gear whereby there will be no need of any intermediate clutch between the motor and the transmission gearing nor any necessity of throwing said clutch out and in every time a change of speed is made, but the aim of my invention is to produce a means whereby by merely shifting the operating lever the different speeds may be had.

A further object of the invention is to produce a simple and inexpensive device and yet one which will be exceedingly effective for the purposes for which it is designed.

These objects, I accomplish by means of such structure and relative arrangement of the parts as will fully appear by a perusal of the following specification and claims.

On the drawings similar characters of reference indicate corresponding parts in the several views.

Figure 1:
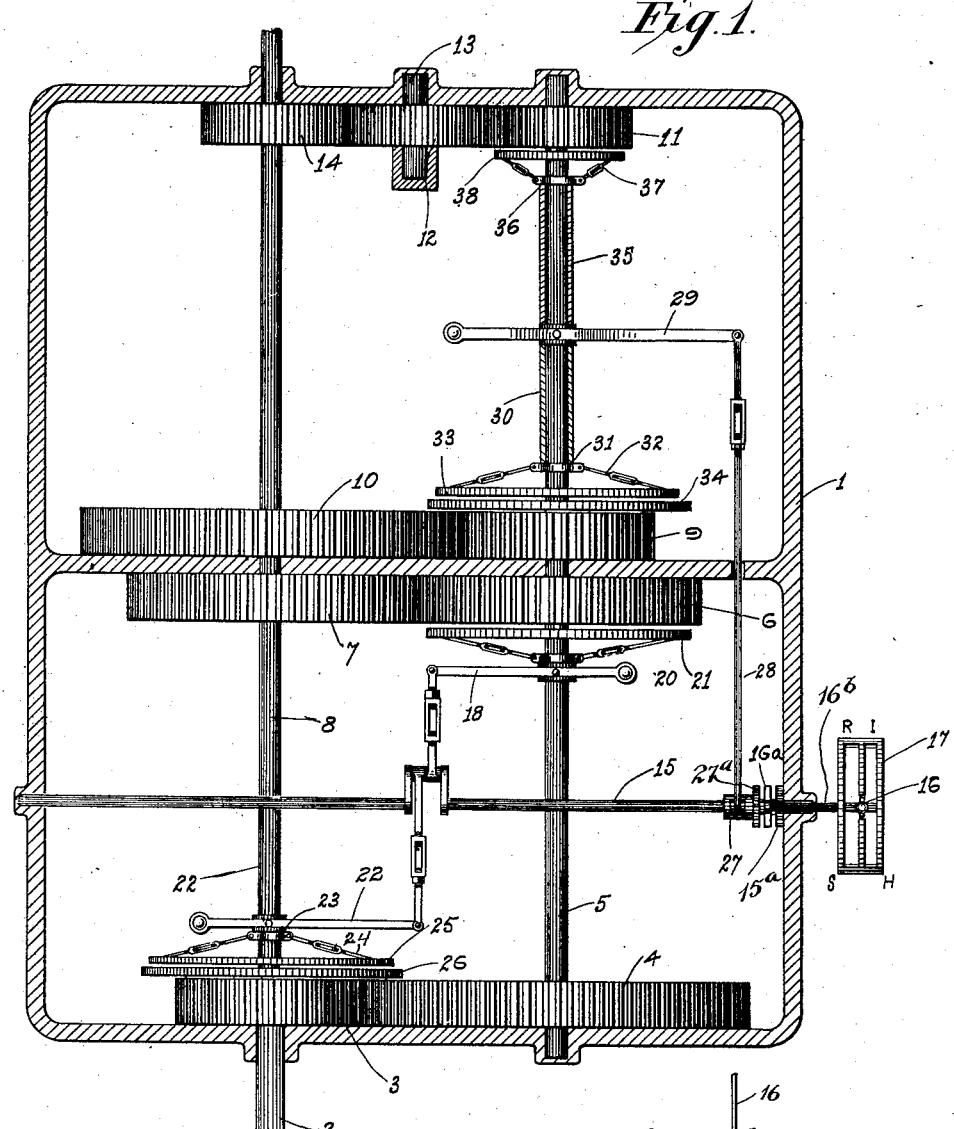
Figure 2:
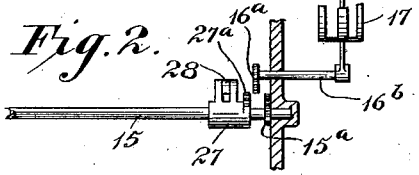

Figure 1 is a top plan view of my transmission gearing showing the gears well spaced apart in order to equally demonstrate the different mechanisms. Fig. 2 is a fragmentary view showing a rod shifting mechanism.

The numeral 1 designates the usual gear casing which may be provided with suitable bearings and so forth for the various shafts to be hereinafter described, the same being of any ordinary type therefore no specific description of the same will be hereinafter given.

The numeral 2 designates the usual driving shaft from the engine which drives a gear 3 intermeshing with a larger gear 4 keyed onto a shaft 5.

The numeral 6 designates a gear loosely mounted on the shaft 5 and intermeshing with a gear 7 keyed to a shaft 8.

The numeral 9 designates a gear loosely mounted on the shaft 5 and intermeshing with a gear 10 keyed to the shaft 8.

The numeral 11 designates a gear loosely mounted on the shaft 5 and engaging a gear 12 mounted on a stub 13, which gear 12 intermeshes with a gear 14 keyed to the shaft 8.

The numeral 15 designates a crank shaft, the movement of which is controlled by an operating lever 16 provided with a shaft $16^b$ carrying a quadrant gear $16^a$ adapted to engage a quadrant gear $15^a$ upon the said shaft 15. The member 16 is movable through an H-shaped guide 17 in which the points as described on the drawings, to-wit: H, I, S and R will be used to designate the different points in said guide 17 for the movement of the lever 16, the operation of which lever will change the speed of the shaft 8 which is the driven shaft as will appear.

Connected with the shaft 15 is a lever 18 adapted to drive a collar 19 connected by links 20 with frictional bands 21 adapted to project into and engage the inner surface of the gear 6. To attain this result the lever 16 is moved to the point indicated as I and causes the gear $16^a$ to engage the gear $15^a$ and move the shaft 15, which will operate the lever 18 with the above result. The gears 3—4—6—7 are so proportioned that this speed will be the intermediate speed of the vehicle. Similarly by throwing the lever 16 to the point indicated as H this will cause a lever 22 which is connected with the crank shaft 15 to drive a collar 23 to cause links 24 to engage frictional bands 25 against the inner circumference of a ring 26 indicated as a part of the gear 3 which will give the direct drive from the shaft 2 to the shaft 8 thus giving high speed to the vehicle. Similarly by moving the lever 16 to the point S, this engages the gear $16^a$ with a gear $27^a$ mounted on a sleeve 27, which action turns the said sleeve 27 and causes it to operate a rod 28 to turn a lever 29. This moves the sleeve 30 to cause a collar 31 to operate links 32 to engage frictional bands 33 with the interior surface of a ring 34 secured to the gear 9, which by reason of the proportion of the gears gives a slow speed to the shaft 8. Also by pulling the lever 16 to the point marked R this will cause the members 27, 28 and 29 to operate to drive a sleeve 35 to move a collar 36 to drive links 37 to cause friction bands 28 to engage the inner surface of the gear 11 which driving through the gears 12 and 14 drives the shaft 8 in a reverse direction from its forward direction. All of the collars are of course keyed to their respective shafts.

While I have shown herein one particular form of clutch and one particular form of operating means therefor still in practice it might be found desirable to use a different form from that shown in the drawings, the main object of the invention being, of course, the idea of having an independent clutch means for each independent and varied movement of the driven shaft 8.

From the foregoing description it will be readily seen that I have produced such a device as substantially fulfils the objects of the invention as set forth herein.

While this specification sets forth in detail the present and preferred construction of the device, still in practice such deviations from such detail may be resorted to as do not form a departure from the spirit of the invention.

Having thus described my invention what I claim as new and useful and desire to secure by Letters Patent is:

A device of the character described comprising a driving shaft and a driven shaft, a third shaft, a gear on said driving shaft, a gear on said third shaft intermeshing with said gear on said driving shaft, a plurality of gears on said driven shaft and a plurality of gears on said third shaft engaging said plurality of gears on said driven shaft, an independent clutch adapted to engage the gear on said driving shaft and each of the plurality of gears on said third shaft, means for operating said clutch members, such means comprising a turnable rod, links connecting said rod with certain ones of said clutch members, a sleeve on said rod, links connecting said sleeve with the remaining clutch members, a gear on said rod and said sleeve, and a shifting lever provided with a gear adapted to engage each of the gears on said rod and said sleeve, as described.

In testimony whereof I affix my signature in presence of two witnesses.

WALTER D. ARNSBURGER.

Witnesses:
P. BARTLEY,
F. L. BARTLEY.

---

Copies of this patent may be obtained for five cents each, by addressing the "Commissioner of Patents, Washington, D. C."